United States Patent Office 2,852,549
Patented Sept. 16, 1958

2,852,549

PREPARATION OF NEUTRAL MIXED PHOSPHATES BY INTERACTION OF PHOSPHATES

Harry W. Coover, Jr., and Richard L. McConnell, Kingsport, Tenn., assignors to Eastman Kodak Company, Rochester, N. Y., a corporation of New Jersey No Drawing. Application February 14, 1956
Serial No. 565,321

7 Claims. (Cl. 260—461)

This invention relates to a process for the preparation of neutral mixed phosphates. In a specific aspect, this invention relates to a process for preparing neutral mixed phosphates having the structural formula:

[RX] [R'X] [R'X] P=X wherein R and R' are radicals selected from the group consisting of alkyl, substituted alkyl, aryl and substituted aryl and wherein X is either oxygen or sulfur.

Neutral mixed phosphates have been prepared by various prior art procedures. For example, such phosphates have been prepared by the reaction of a primary alcohol with phosphorus oxychloride and the resulting phosphoryl dichloride is reacted with sodium phenoxide. Also such phosphates have been prepared by reacting a trialkyl phosphate with an alkyl chlorosulfinate or chloroformate. Another procedure involves the reaction of a chlorophosphate with an alcohol, a phenol or an alkali metal alkoxide. Each of the procedures suffers from some disadvantage. For example, the latter procedure requires the preparation of the chlorophosphate intermediate, which must be isolated and when the chlorophosphate is reacted with an alcohol, a tertiary organic base is required to remove the liberated hydrogen chloride. The only alternative is to react an alkali metal alkoxide with the chlorophosphate, but the yields from this procedure are poor due to competing reactions.

In accordance with this invention, it has been found that neutral, mixed phosphates can be produced economically in excellent yields by reacting a phosphate selected from the group consisting of trialkyl phosphates and trialkyl thiophosphates wherein the alkyl radicals contain up to 8 carbon atoms per alkyl radical with another phosphate having the structural formula:

(R''X)₃P=X wherein R'' is similar to R and R' to be discussed in detail below and X is selected from the group consisting of oxygen and sulfur at an elevated temperature. The products of this invention have the structural formula:

[RX] [R'X] [R'X] P=X wherein R and R' are radicals selected from the group consisting of alkyl, containing up to 8 carbon atoms, such as methyl, ethyl, butyl, octyl and the like, haloalkyl, containing up to 8 carbon atoms, such as chloropropyl, bromobutyl, and the like, and aryl and substituted aryl, such as phenyl, cresyl, chlorophenyl, nitrophenyl, and the like. In this structural formula, R and R' are different and at least one of R and R' are alkyl. Also X is either oxygen or sulfur.

The process is carried out by reacting the trialkyl phosphate or thiophosphate with another phosphate for a period of 1 to 24 hours at a temperature within the range of 150 to 300° C. Preferably, the temperature is within the range of 190 to 240° C. Suitable solvents may be used but usually they are not necessary. When one trialkyl phosphate is reacted with another trialkyl phosphate, the yield of mixed alkyl phosphates is almost quantitative and the residual amount of either starting phosphate is negligible. The composition of the mixed alkyl phosphates can be controlled by the molar quantities of each phosphate employed. Mixed alkylaryl phosphates can be produced by the reaction of trialkyl and triaryl phosphates, but the yields are not as good as those obtained in producing mixed alkyl phosphates.

The products of this invention are useful as plasticizers, solvents, pesticides, synthetic lubricants and intermediates for the preparation of other organophosphorus compounds. Cellulose esters plasticized with these mixed phosphates are self-extinguishing.

The following examples are illustrative of this invention and in these examples the parts shown are parts-by-weight.

*Example 1.—Mixed butyl ethyl phosphates*

A mixture of 36.4 parts of triethyl phosphate and 53.2 parts of tributyl phosphate was heated at 210–240° C. under total reflux for 8 hours. When the reaction mixture was vacuum distilled, 80 parts of neutral, water white product boiling from 82° to 122° C. at 3.2 mm. pressure was obtained. No unreacted triethyl or tributyl phosphate was recovered. This mixture of butyl ethyl phosphates is an excellent flameproofing plasticizer for cellulose esters. The mixed butyl ethyl phosphates can be used alone or in combination with other conventional plasticizers to give any desired flow. Cellulose esters containing 15–20 parts of this mixture of phosphates are self-extinguishing.

The above mixture, when fractionated, yields 33 parts of butyl diethyl phosphate boiling at 83–86° C. at 3 mm. and 43 parts of dibutyl ethyl phosphate boiling at 95–99° C. at 3 mm. This fractionation is unnecessary, however, since the mixture of butyl ethyl phosphates is an excellent plasticizer and solvent without fractionation.

*Example 2.—Butyl diethyl phosphate*

A mixture of 73.8 parts of triethyl phosphate and 53.2 parts of tributyl phosphate reacted according to the procedure of Example 1, gave almost exclusively butyl diethyl phosphate which boiled at 83–88° C. at 2.8 mm.

*Example 3.—Mixed methyl propyl phosphates and thiophosphates*

A mixture of 28.0 parts of trimethyl phosphate and 48.0 parts of tripropyl thiophosphate was reacted according to the procedure given in Example 1. The mixture of methyl propyl phosphates and thiophosphates boiled over the range 84–98° C. at 2.8 mm.

*Example 4.—Mixed ethyl 2-ethylhexyl phosphates*

A mixture of 36.4 parts of triethyl phosphate, 86.8 parts of tris(2-ethylhexyl)phosphate, and 5.0 parts of anhydrous sodium carbonate was heated at 210–215° C. with good stirring for 8 hours. The reaction mixture was distilled directly from the reaction vessel and the following cuts were obtained:

| Cut | Boiling point, ° C. | nᴅ¹⁶ | Yield in parts |
|---|---|---|---|
| 1 | 58–107 (0.7 mm.) | 1.4009 | 10.0 |
| 2 | 107–108 (0.7 mm.) | 1.4260 | 28.4 |
| 3 | 109–168 (0.7–1.2 mm.) | 1.4336 | 52.5 |
| 4 | 168–205 (2.2 mm.) | 1.4350 | 15.0 |
| 5 | Residue | | 15.5 |

Cut 2 is diethyl 2-ethylhexyl phosphate while cuts 3 and 4 are predominantly ethyl di-2-ethylhexyl phosphate.

*Example 5.—Mixed ethyl phenyl phosphates*

A mixture of 36.4 parts of triethyl phosphate and 65.2 parts of triphenyl phosphate was reacted according to the procedure given in Example 1. The mixed phosphates boiled within the 97–178° C. range at 2.0 mm.

*Example 6.—Mixed cresyl ethyl phosphates*

A mixture of 36.4 parts of triethyl phosphate and 73.6 parts of tricresyl phosphate was reacted according to the procedure in Example 1. The mixed cresyl ethyl phosphates boiled within the 102–108° C. range at 2.3 mm.

*Example 7.—Mixed chloroethyl isobutyl phosphates*

A mixture of 57.0 parts of tris[2-chloroethyl]phosphate and 53.2 parts of triisobutyl phosphate was reacted according to the procedure in Example 1. The mixed chloroethyl isobutyl phosphates boiled within the 118–159° C. range at 1.8 mm.

*Example 8.—Mixed butyl ethyl thiophosphates*

A mixture of 36.4 parts of triethyl phosphate and 62.8 parts of tributyl phosphorotrithioate $[(C_4H_9S)_3P=O]$ was reacted according to the procedure in Example 1. The mixed butyl ethyl thiophosphates boiled within the 84–135° C. range at 2.3 mm.

When at least one of the reactants is a trialkyl phosphate or thiophosphate wherein the alkyl radicals contain a branched carbon chain, there is a tendency to form some olefinic hydrocarbons in the reaction. For example, when triethyl phosphate and tris(2-ethylhexyl)phosphate are reacted as in Example 4, some isobutylene and 2-ethylhexene are liberated at the reaction temperature. This tendency can be overcome by adding to the reaction mixture an alkaline compound that is inert to the reactants and reaction products. A satisfactory alkaline material is sodium carbonate, and it can be used in an amount within the range of 0.5 to 5% based on the total weight of the reaction mixture.

We claim:

1. The process of preparing neutral mixed phosphates containing three organic radicals, each of said radicals being selected from the first group consisting of alkyl, containing up to 8 carbon atoms, haloalkyl containing up to 8 carbon atoms, phenyl and cresyl, two of said radicals being identical and at least one of said radicals being an alkyl radical containing up to 8 carbon atoms, which comprises reacting a phosphate selected from the group consisting of trialkyl phosphates and trialkyl thiophosphates wherein the alkyl radicals contain up to 8 carbon atoms per alkyl radical with a different phosphate having the structural formula $(RX)_3P=X$ wherein R is selected from the first group set forth above and X is selected from the group consisting of oxygen and sulfur at a temperature of 150 to 300° C.

2. The process of preparing dibutyl ethyl phosphate which comprises reacting triethyl phosphate with tributyl phosphate at a temperature of 150 to 300° C. for a period of 1 to 24 hours.

3. The process of preparing a mixture of methyl propyl phosphates and thiophosphates which comprises reacting trimethyl phosphate with tripropyl thiophosphate at a temperature of 150–300° C. for a period of 1 to 24 hours.

4. The process of preparing a mixture of diethyl 2-ethylhexyl phosphate and ethyl di-2-ethylhexyl phosphate which comprises reacting triethyl phosphate with tris(2-ethylhexyl) phosphate at a temperature of 150 to 300° C. for a period of 1 to 24 hours.

5. The process according to claim 4 wherein the reaction is effected in the presence of from 0.5 to 5% by weight of sodium carbonate.

6. The process of preparing a mixture of diethylphenyl phosphate and ethyl diphenyl phosphate which comprises reacting triethyl phosphate with triphenyl phosphate at a temperature of 150 to 300° C. for a period of 1 to 24 hours.

7. The process of preparing a mixture of butylethyl phosphates and thiophosphates which comprises reacting triethyl phosphate and tributyl phosphorotrithioate at a temperature of 150 to 300° C. for a period of 1 to 24 hours.

References Cited in the file of this patent

Rueggeberg et al.: "Jour. Am. Chem. Soc." 70, 1802–1804 (1948).